(12) United States Patent
Jones

(10) Patent No.: US 11,687,338 B2
(45) Date of Patent: Jun. 27, 2023

(54) COMPUTATIONAL STORAGE WITH PRE-PROGRAMMED SLOTS USING DEDICATED PROCESSOR CORE

(71) Applicant: Seagate Technology LLC, Fremont, CA (US)

(72) Inventor: Marc Tim Jones, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 56 days.

(21) Appl. No.: 17/245,286

(22) Filed: Apr. 30, 2021

(65) Prior Publication Data
US 2022/0350604 A1 Nov. 3, 2022

(51) Int. Cl.
G06F 9/455 (2018.01)
G06F 9/30 (2018.01)
G06F 13/362 (2006.01)
G06F 9/50 (2006.01)

(52) U.S. Cl.
CPC ........ G06F 9/3017 (2013.01); G06F 9/30101 (2013.01); G06F 9/5016 (2013.01); G06F 13/362 (2013.01); G06F 2209/508 (2013.01)

(58) Field of Classification Search
None
See application file for complete search history.

(56) References Cited

U.S. PATENT DOCUMENTS

| | | | | |
|---|---|---|---|---|
| 5,619,665 A | * | 4/1997 | Emma | G06F 9/45504 703/27 |
| 8,074,055 B1 | * | 12/2011 | Yates, Jr. | G06F 9/3005 712/229 |
| 11,418,394 B1 | * | 8/2022 | Wells | H04L 41/0823 |
| 11,568,051 B2 | * | 1/2023 | Zhang | G06N 20/00 |
| 2002/0099930 A1 | * | 7/2002 | Sakamoto | G06F 9/30174 712/209 |
| 2003/0154359 A1 | * | 8/2003 | Henry | G06F 9/30185 712/E9.035 |
| 2008/0216073 A1 | * | 9/2008 | Yates | G06F 9/3861 718/100 |
| 2013/0268742 A1 | * | 10/2013 | Yamada | G06F 9/5044 712/226 |
| 2019/0325302 A1 | | 10/2019 | Savic et al. | |
| 2020/0193017 A1 | | 6/2020 | Bannister et al. | |
| 2020/0403905 A1 | * | 12/2020 | Allen | H04L 45/24 |
| 2022/0197704 A1 | * | 6/2022 | Gibb | G06F 9/5072 |
| 2022/0244833 A1 | * | 8/2022 | Milbert | G06T 19/20 |
| 2022/0261732 A1 | * | 8/2022 | Rajagopalan | G06Q 10/06375 |
| 2022/0262206 A1 | * | 8/2022 | Djemal | G07F 17/3213 |

* cited by examiner

*Primary Examiner* — Hyun Nam
(74) *Attorney, Agent, or Firm* — Holzer Patel Drennan

(57) ABSTRACT

The technology disclosed herein provides a method including determining one or more dedicated computations storage programs (CSPs) used in a target market for a computational storage device, storing the dedicated CSPs in one or more pre-programmed computing instruction set (CIS) slots in the computational storage device, translating one or more instructions of the dedicated CSPs for processing using a native processor, loading one or more instructions of programmable CSPs to a CSP processor implemented within an application specific integrated circuit (ASIC) of the computational storage device, and processing the one or more instructions of the programmable CSPs using the CSP processor.

20 Claims, 5 Drawing Sheets

US 11,687,338 B2

COMPUTATIONAL STORAGE WITH PRE-PROGRAMMED SLOTS USING DEDICATED PROCESSOR CORE

BACKGROUND

A computational storage device (CSD) is a storage device that provides persistent data storage and computational services. Computational storage is about coupling compute and storage to run applications locally on the data, reducing the processing required on the remote server, reducing memory requirements on the remote server, and reducing data movement. To do that, a processor on the drive is dedicated to processing the data directly on that drive, which allows the remote host processor to work on other tasks. Berkeley Packet Filter (BPF) is a technology used in certain CSD systems for processing data. It provides a raw interface to data link layers, permitting raw link-layer packets to be sent and received. eBPF (or Extended Berkeley Packet Filter) describes an computing instruction set (CIS) that has been selected for drive-based computational storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein provides a method including determining one or more dedicated computations storage programs (CSPs) used in a target market for a computational storage device, storing the dedicated CSPs in one or more pre-programmed computing instruction set (CIS) slots in the computational storage device, translating one or more instructions of the dedicated CSPs for processing using a native processor, loading one or more instructions of programmable CSPs to a CSP processor implemented within an application specific integrated circuit (ASIC) of the computational storage device, and processing the one or more instructions of the programmable CSPs using the CSP processor.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Figure 1:
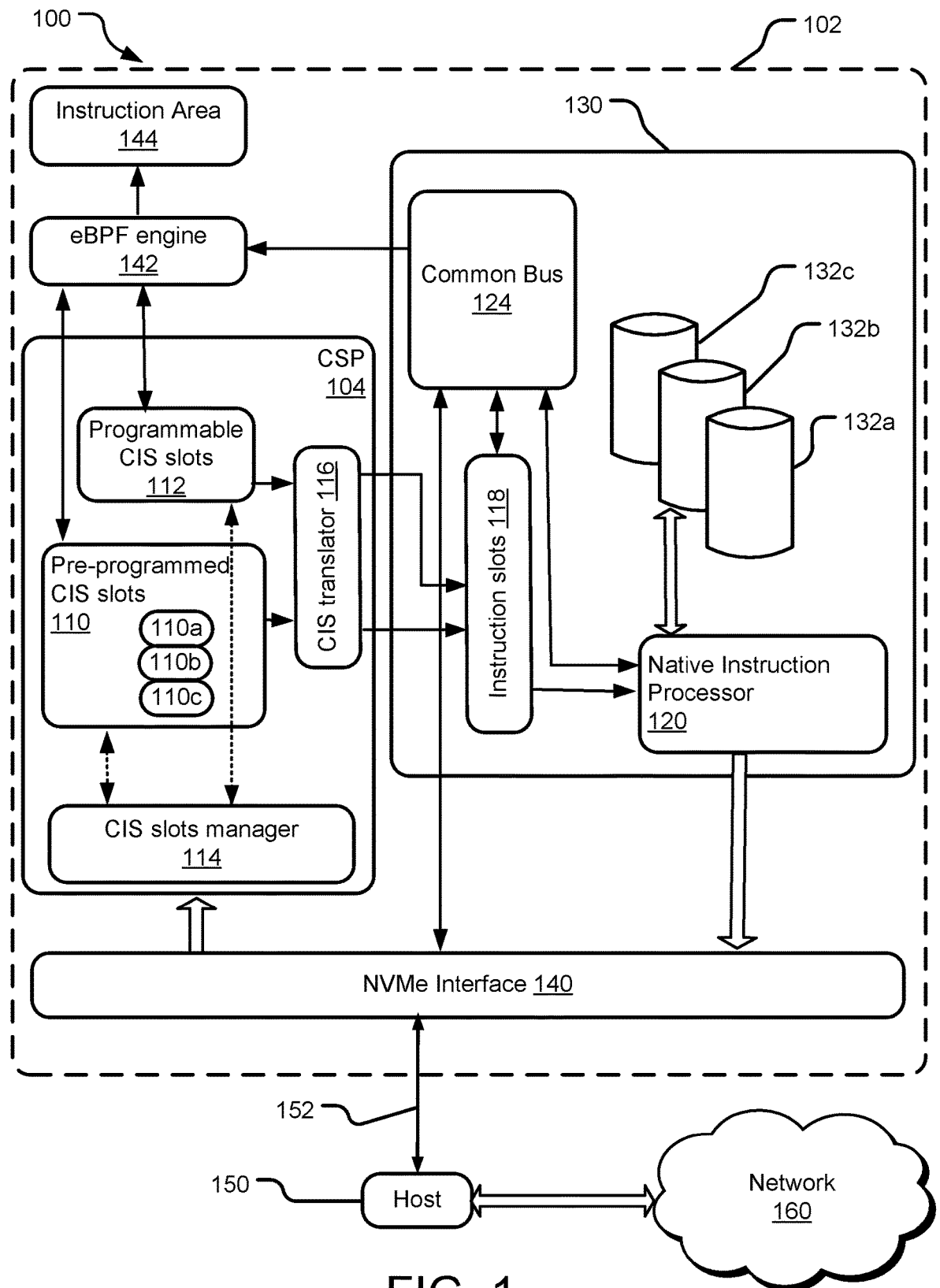
FIG. 1 illustrates a schematic diagram of an example computational storage device (CSD) system with pre-programmed slots using a dedicated eBPF processor core.

A computational storage device (CSD) is a storage device that provides persistent data storage and computational services. Computational storage is about coupling compute and storage to run applications locally on the data, reducing the processing required on the remote server, reducing memory usage on the remote server, and reducing data movement. To do that, a processor on the drive is dedicated to processing the data directly on that drive, which allows the remote host processor to work on other tasks. Berkeley Packet Filter (BPF) is a technology used in certain CSD systems for processing data. It provides a raw interface to data link layers, permitting raw link-layer packets to be sent and received. eBPF (or Extended Berkeley Packet Filter) describes an computing instruction set (CIS) that has been selected for drive-based computational storage.

eBPF is a relatively simple instruction set, but covers instructions necessary for complex program development. eBPF may be interpreted on the target device or translated into the native instruction set for performance (since interpretation is ultimately slower than native execution. However, in some implementations, eBPF is suboptimal for translation to modern embedded processors such as ARM, RISC-V, etc., which makes it less than ideal for computational storage applications. CSD solutions using eBPF may either interpret eBPF instructions on the device or translate from eBPF to the native instruction set (ARM or RISC-V). Interpreting eBPF can be slow due to differences between eBPF and the native architecture as well as translation time due to register width differences between eBPF [64-bits] and typical embedded ARM/RISC-V [32-bits].

Some implementations of the CSD disclosed herein may implement interpretation of the eBPF instructions on the native architecture, which represents the slowest form of computational storage. Alternative implementations may implement translation where the eBPF instructions are translated into the native instruction set of the computational storage processors such as ARM, RISC-V, etc. The technology disclosed herein is directed to using a computational instruction set (CIS) such as the eBPF within the CSD and optimizing the eBPF before generating a native instruction set (such as an ARM instruction set, an RISC instruction set, etc.). Specifically, the implementations disclosed herein are directed towards using a computational instruction set (CIP) such as extended Berkeley Packet Filter (eBPF) within the CSD and profiling the performance of the CIP to generate one or more CIP execution parameters. In example implementations, these parameters may include, for example, (a) total execution time of the program, (b) number of times each instruction is executed, (c) the percentage taken for every branch in the program, (d) number of DRAM memory accesses, etc.

Implementations of the CSD disclosed herein exposes program slots as a mixture of programmable and pre-programmed slots that can be used by the host. The pre-programmed slots can represent programs targeted to a particular market, such as a drive used in machine learning applications providing image processing functions like max-pooling (a sample-based discretization process for dimensionality reduction), or in natural language processing applications providing text segmentation and parsing, etc.

Furthermore, in one implementation, the CSD disclosed herein provides an eBPF processor core within an CSD that natively executes eBPF instructions. Specifically, such eBPF processor maybe configured to process instructions of a pre-programmed CIS slot of the CSD. The eBPF processor may be implemented as part of the CSD's application specific integrated circuit (ASIC) such that it can be controlled by another native processor such as an ARM processor or an RISC-V processor. For example, such native processor may control the eBPF processor core via a common bus, such as an AXI or and ARM bus.

The interface between such native processor and the eBPF processor allows loading code from one or more programmable or pre-programmed slots as well as controlling execution of the code, such as start, stop, single-step, reset, etc. An implementation of the eBPF processor core may include a 64-bit data-path SRAM for the eBPF registers, data stack, and instruction memory along with an interface to a DRAM for access to data (for read and write). Furthermore, the eBPF co-processor may also support native execution of eBPF instructions with an internal (eBPF native) 64-bit instruction and data bus.

FIG. 1 illustrates a schematic diagram of a system 100 having a computational storage device (CSD) 102 with pre-programmed slots that can be used by a host and where one or more pre-programmed or programmable slots use a dedicated processor core. The CSD 102 may include a memory 130 implemented using hard disc drives (HDDs), solid state drives (SSDs), hybrid drives, etc. In the illustrated implementation, the memory 130 is implemented using HDDs 132a-132c (HDDs 132). The CSD 102 allows processing data on the HDDs 132 where the data is stored, enabling the generation of insights and value directly from the data stored on the HDDs 132. Such smart processing of data at the CSD 102 reduced the movement of large amounts of data to external processing and delivers numerous benefits including reduced latency, reduced bandwidth usage, reduced host memory usage, increased security, energy savings, etc.

The CSD 102 provides such processing of data at the storage by using a computational storage processor (CSP) 104 working with the memory 130. The CSD 102 may include an interface to communicate with a host 150. For example, such an interface is an NVMe interface 140 that communicates with the host 150 using a PCIe interface 152. The host 150 may be a server or other computing system that maybe implemented in the vicinity of the CSD 102 and may be communicatively connected to a network 160, such as the Internet.

The host 150 may receive from the network 160 or develop one or more computing instruction sets (CISs) for processing data on the CSD 102. An example of such as CIS is an extended Berkeley Packet Filter (eBPF). The CISs may provide interface to the data on the memory 130 at the data link layer and may be configured to process the data at the data link layer. The NVMe interface 140 may download such CIS from the host using a download command such as an NVMe download command. Once the NVMe interface 140 downloads one or more CIS from the host 150, the CIS is stored at a CIS slot 110 on the CSP 104.

In one implementation, the CSP 104 may have a number of slots for pre-programmed CIS, referred to here as pre-programmed CIS slots 110. The pre-programmed CIS slots 110 may include programs targeted to a particular markets. For example, for a CSD used in machine learning applications, image processing functions such as max-pooling may be stored in the pre-programmed CIS slots 110. Alternatively, for a CSD used in natural language processing applications, a text segmentation program or a parsing program may be stored in the pre-programmed CIS slots 110. Table I, disclosed below, illustrates a list of possible programs that may be stored in the pre-programmed CIS slots 110 for various markets.

| Program | Description | Market |
| --- | --- | --- |
| Search | Find instances of a substring within a stream of data. | General |
| Filter | Reduce data based upon some key or search substring. | General |
| Resize | Resize an image through max-pooling or other resize method. | Image Processing, Machine Learning |
| Motion Detect | Detect motion of an object from a series of images. | Surveillance |
| FFT | Fast Fourier Transform of an image. | Digital Image Processing |
| Hash | Construct a hash of a range of LBAs (such as SHA-256). | Anti-Virus, General, De-duplication. |
| Compress/Encrypt | Compress and/or Encrypt (decompress/decrypt) a range of LBAs. | General |
| Max-pooling, ReLu calculation | Various convolutional neural network (CNN) module functions | Artificial Intelligence |
| Face Detection | Detect face from images | Surveillance |

On the other hand, the CSP 104 may also include a number of slots that can be programmed as necessary, referred to as programmable CIS slots 112. The CSP 104 may also include a CIS slots manager 114 that is used to manage the programs in the pre-programmed CIS slots 110 and the programmable CIS slots 112. For example the CIS slots manager 114 may monitor usage of the programs in the programmed CIS slots 110 and the programmable CIS slots 112 over time and based on the usage move one or more programs between the pre-programmed CIS slots 110 and the programmable CIS slots 112. Specifically, given that CSDs may be able to have only a limited number of CIS slots, and therefore, only a limited number of pre-programmed CIS slots, to maximize the usage of the pre-programmed CIS slots 110, the CIS slots manager 114 moves more frequently used programs to the pre-programmed CIS slots 110.

In one implementation, a CIS translator 116 translates the CIS from the pre-programmed CIS slots 110 and the programmable CIS slots 112 to native instruction set, such as an instruction set for an ARM processor, an instruction set for an RISC-V processor, etc. In one implementation, the CIS translator 116 translates the CIS from the pre-programmed CIS slots 110 and stores the native instructions in instruction slots 118, whereas the CIS translator 116 translates the CIS from the programmable CIS slots 112 dynamically as necessary. Given that the time for eBPF to native instruction translation time being in the range of 200 microseconds, such translation can be done dynamically upon execution or prior to execution without any significant impact on latency.

In one implementation, the pre-programmed CIS slots 110 may also be implemented using different types of memories. For example, CIS slots 110*a* may be implemented using instruction tightly coupled memory (ITCM), CIS slots 110*b* may be implemented using SRAM, and CIS slots 110*c* may be implemented using DRAM. In one implementation, the type of pre-programmed CIS slots where pre-programmed instructions are stored may depend on the usage levels of such pre-programmed instructions. Thus, the pre-programmed instructions that are used more often may be stored in the CIS slots 110*a* with faster ITCM memory, whereas pre-programmed instructions that are used less often may be stored in the CIS slots 110*c* with relatively slower DRAM memory.

The native instruction sets generated by the CIS translator 116 are allocated to the instruction slots 118 to operate on the native instruction processor 120 to process data from the memory 130. In one implementation, the native instruction slots 118 and the native instruction processor 120 may be communicatively connected to an eBPF processor core, also referred to as an eBPF engine 142 via a common bus 124. For example, the common bus 124 may be an AXI bus or an ARM bus. Furthermore, the eBPF engine 142 may also be communicatively connected to the CIS slots such as the pre-programmed CIS slots 110 and the programmable CIS slots 112.

The eBPF engine 142 may be controlled by the native instruction processor 120 via the common bus 124. The eBPF engine 142 may process the eBPF instructions from the slots 110, 112 without them being interpreted by the CIS translator 116. Therefore, provisioning the eBPF engine 142 reduces the time that may be required in translating the eBPF instructions into native instructions. Furthermore, it also reduces the process load on the native instruction processor 120 and its registers. Specifically, given the width differences between eBPF instruction registers, which maybe 64-bits, and native instruction registers, which may be 32-bits, removing the necessity to interpret the eBPF instructions from the CIS slots 110, 112 to the native instructions makes processing the CIS instructions more efficient.

The eBPF engine may have its own instruction area 144 for storing the eBPF instructions, as compared to the native instructions stored in the native instruction slots 118. In one implementation, the eBPF engine 142 may be dedicated to processing eBPF instructions from the programmable CIS slots 112 whereas the eBPF instructions from the pre-programmed CIS slots 110 are interpreted by the CIS translator 116 for further processing by the native instruction processor 120. In yet another implementation, the instructions stored in the pre-programmed CIS slots 110 may be compiled to the native instruction set and stored in the instruction slots 118 to provide faster performance. In one implementation, the eBPF engine 142 may be configured such that it is constrained to have accesses to only the computational program memory (CPM), which is a subset of DRAM on the CSD 102. Furthermore, the eBPF engine 142 may be configured to expose performance profiling data via the common bus to the host 150 via the common bus 124, or via a trace or watchpoint control mechanism for eBPF program debugging.

Figure 2:
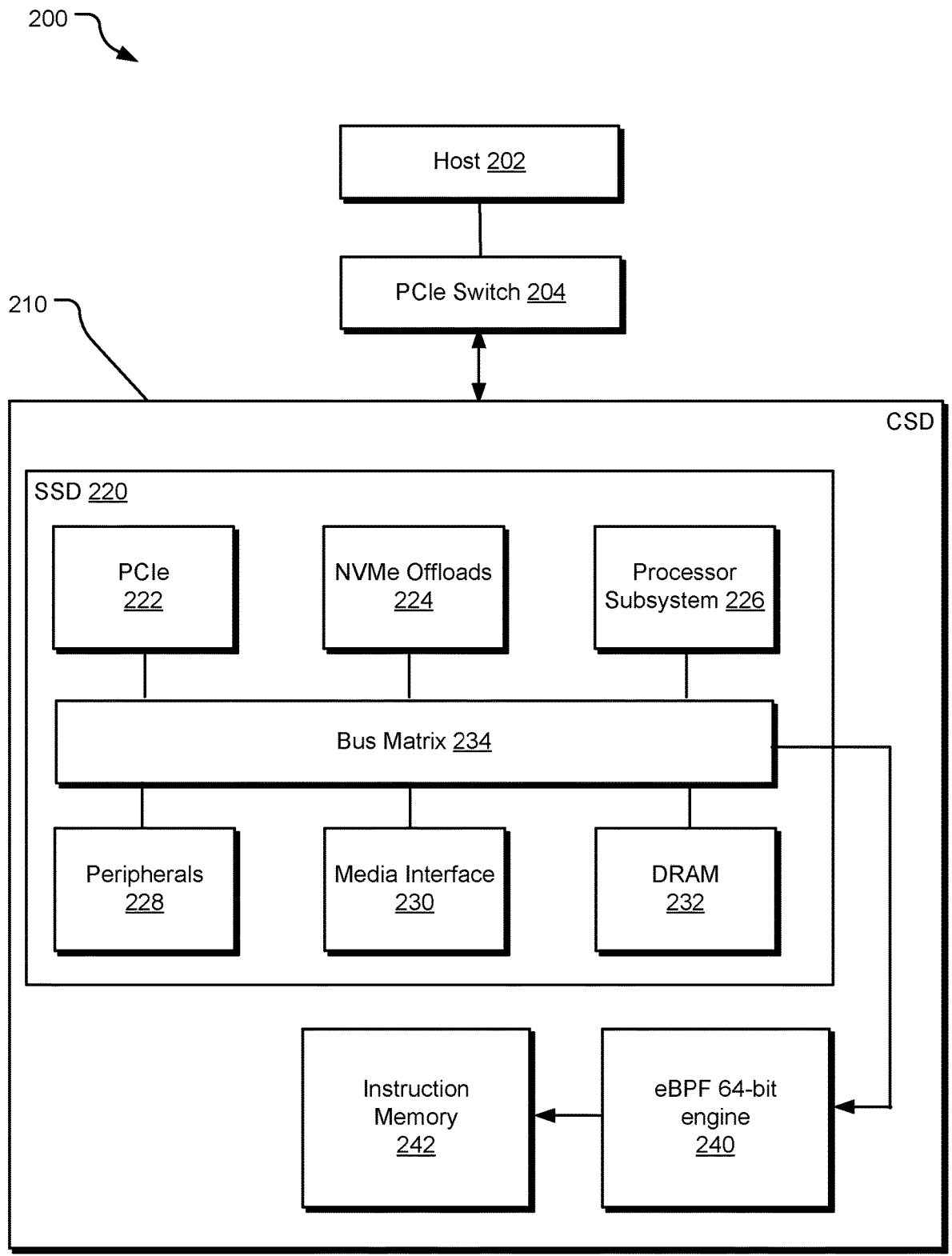
FIG. 2 illustrates an alternative schematic diagram of an example system for computational storage device (CSD) system with pre-programmed slots using a dedicated eBPF processor core.

FIG. 2 illustrates an alternative schematic diagram of a computational storage device (CSD) system 200 with pre-programmed slots using a dedicated eBPF processor core. Specifically, system 200 includes a host 202 communicatively connected to CSD 210 via a PCIe switch 204. The CSD 210 may include an SSD 220 with a bus matrix 234 that is configured to communicate with an eBPF engine 240. For example, the eBPF engine 240 may be a 64-bit engine that processes eBPF instructions without them being translated into native instructions. The eBPF engine 240 may also have an instruction memory 242 that is used to store eBPF instructions and a stack to store data and program context.

The SSD 220 may also include a PCIe interface 222 that is used to communicate with the PCIe switch 204, an NVMe offloads module to optimize NVMe functionality such as data flow operations, a processor subsystem 226, one or more peripherals 228, a media interface 230, and local storage DRAM 232. In one implementation, the processor subsystem 226 may control the eBPF engine 240 using the bus matrix 234.

Figure 3:
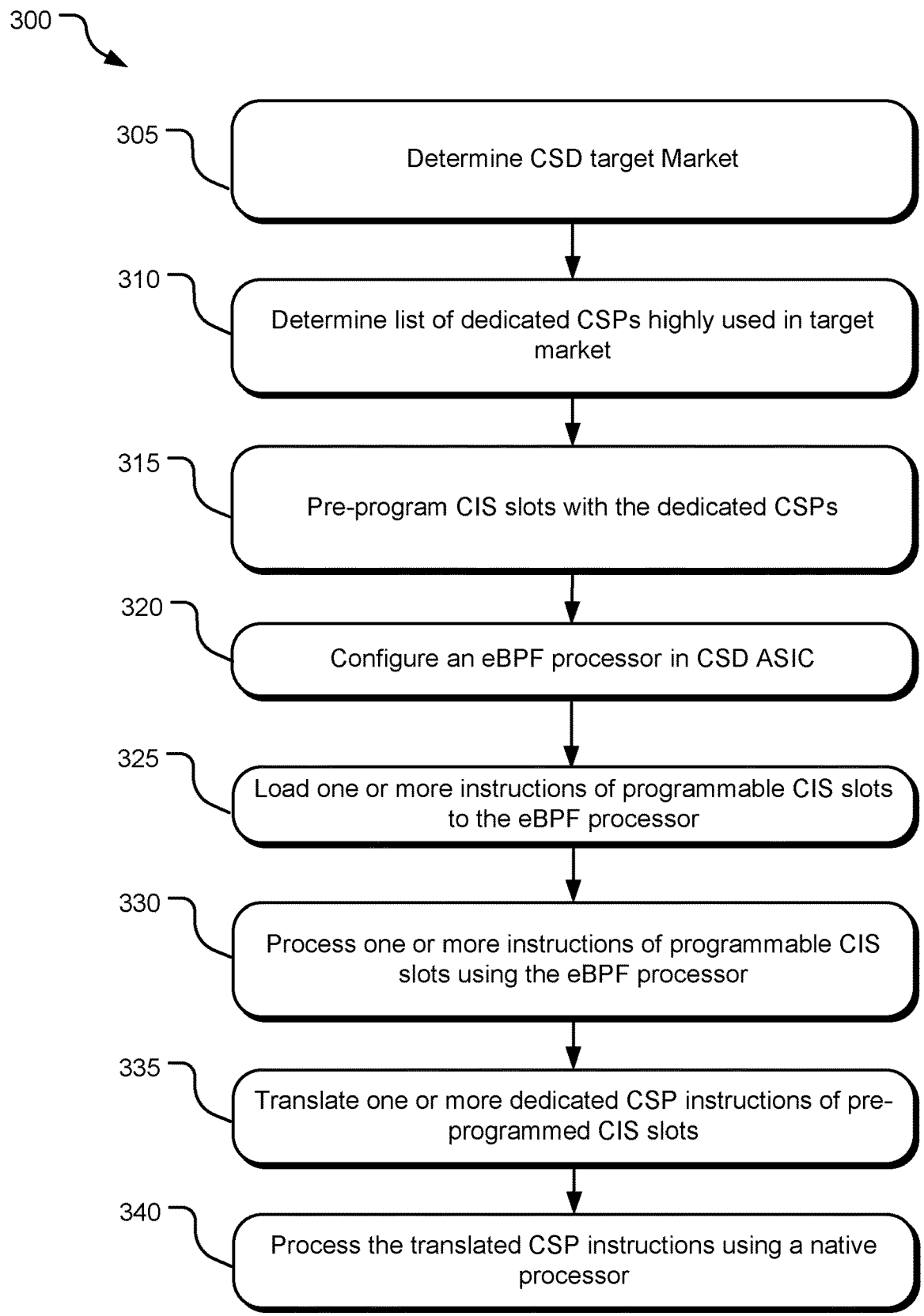
FIG. 3 illustrates example operations for using the computational storage device (CSD) system with pre-programmed slots using a dedicated eBPF processor core.

FIG. 3 illustrates example operations 300 for using the computational storage device (CSD) system with pre-programmed slots using a dedicated eBPF processor core. An operation 305 determines a target market for a CSD. For example, such determination may be made by monitoring the use over time or by receiving an input from a user about intended usage of the CSD. An operation 310 determines a list of CSPs that are highly used in the target market. For example, if the target market is artificial intelligence (AI) applications, highly used CSPs may include one or more neural network modules such as an ReLu calculation program.

Subsequently, an operation 315 pre-programs various CIS slots with the dedicated CSPs designated as highly used CSPs. For example, in one implementation, the operation 315 pre-programs the CIS slots with eBPF programs. Alternatively, the operation 315 may pre-program the CIS slots with eBPF programs translated into native instruction sets such as ARM instructions. Yet alternatively, the operation 315 may compile the ARM instructions with firmware and store the compiled instructions for processing by a processor of the CSD.

Subsequently, an operation 320 configures an eBPF processor in CSD ASIC. For example, the eBPF processor may be configured so that it can be controlled using a common bus if the CSD. The eBPF processor may be configured to have its own instruction memory and stack. An operation 325 loads one or more eBPF instructions of programmable CIS slots to the eBPF processor. At operation 330, the eBPF processor processes one or more instructions stored in the programmable CIS slots. On the other hand, an operation 335 translates one or more dedicated CSP instructions of the pre-programmed CIS slots and these translated CSP instructions are processed at 340 using a native processor such as an ARM processor or an RISC-V processor.

Figure 4:
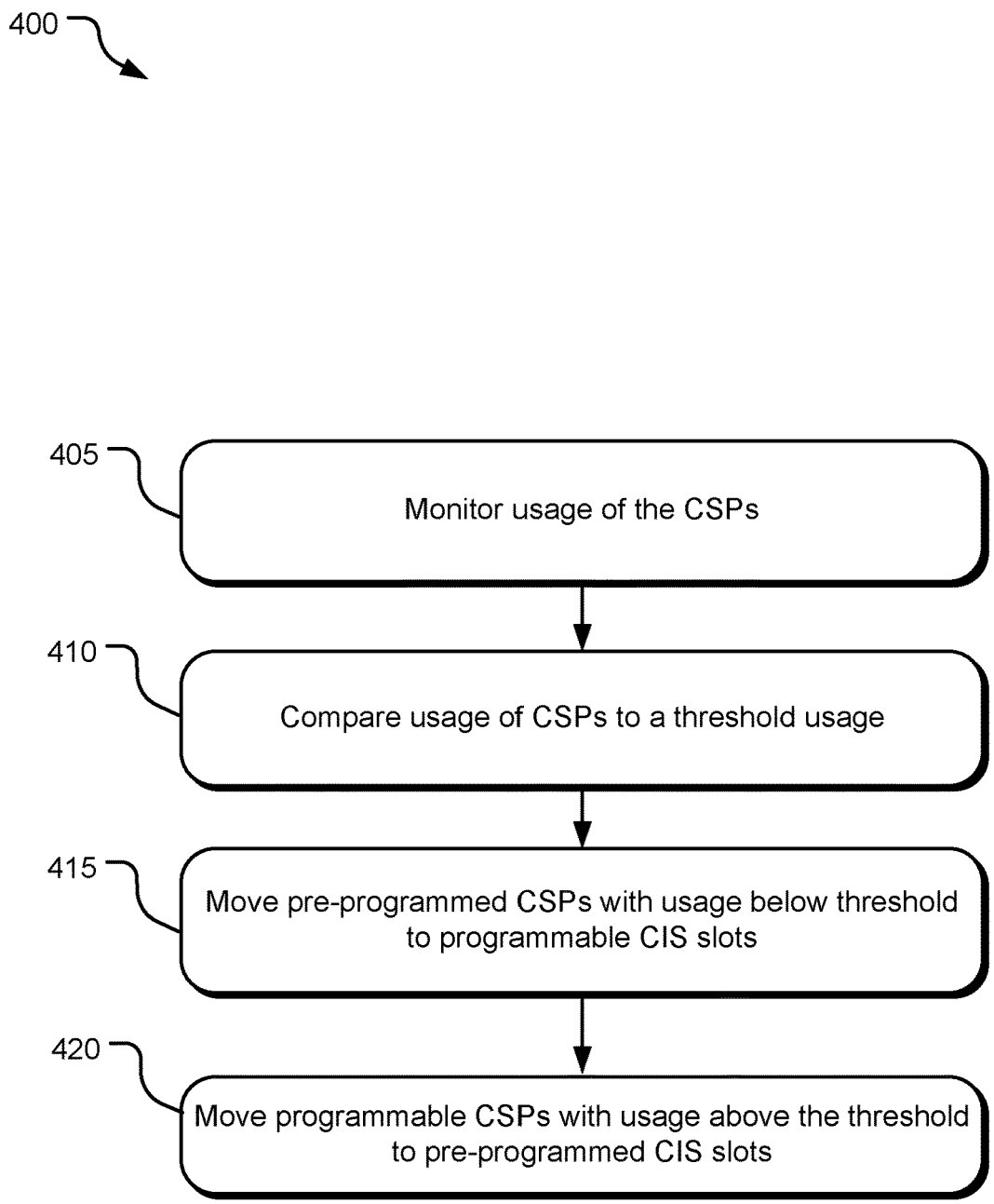
FIG. 4 illustrates alternative example operations for using the computational storage device (CSD) system with pre-programmed slots using a dedicated eBPF processor core.

FIG. 4 illustrates alternative example operations 400 for using the computational storage device (CSD) system with pre-programmed slots using a dedicated eBPF processor core. Specifically, an operation 405 monitors usage of various CSPs in the CIS slots of a CSD over a period of time. An operation 410 compares the usage to a threshold usage. An operation 415 moves CSPs from pre-programmed CIS slots to programmable CIS slots if the usage of such CSPs is below the usage threshold. On the other hand, an operation 420 moves CSPs from one or more programmable CIS slots to a pre-programmed CIS slots if the usage of such CSPs is above the usage threshold.

In one implementation, where the pre-programmed CIS slots include different types of memories with different speed, the operations 415 and 420 may also allocate the pre-programmed CIS slots based on the comparison of the usage of the CSPs to the threshold usage. For example, CSPs with usage above threshold may be allocated faster ITCM CIS slots 110a, whereas CSPs with usage below the threshold may be allocated slower memory such as the SRAM CIS slots 110b or the DRAM CIS slots 110c.

Figure 5:
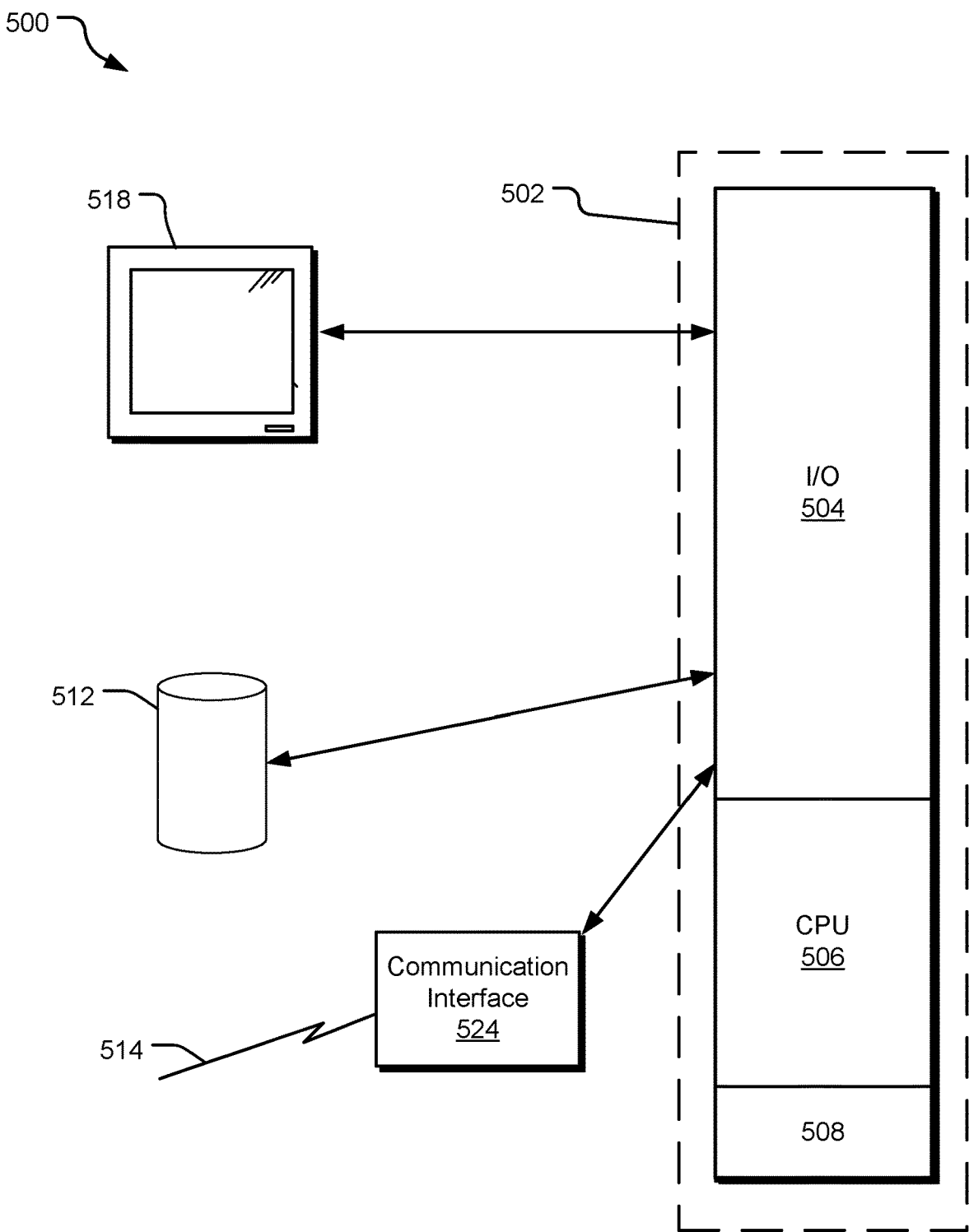
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   determining one or more dedicated computations storage programs (CSPs) used in a target market for a computational storage device;
   storing the dedicated CSPs in one or more pre-programmed computing instruction set (CIS) slots in the computational storage device;
   translating one or more instructions of the dedicated CSPs to be processable by a native processor;
   loading one or more instructions of a CSP stored in a programmable CIS slot to a CSP processor implemented within an application specific integrated circuit (ASIC) of the computational storage device; and
   processing the one or more instructions of the CSP stored in the programmable CIS slot using the CSP processor.

2. The method of claim 1, wherein the native processor of the computational storage device controls loading one or more instructions of the CSP stored in the programmable CIS slot to the CSP processor.

3. The method of claim 2, wherein the native processor of computational storage device controls loading one or more instructions of the dedicated CSPs to the CSP processor using a common bus of the computational storage device.

4. The method of claim 1, wherein the dedicated CSPs are extended Berkley Packet Filter (eBPF) instruction sets and the CSP progressor is an eBPF processor.

5. The method of claim 1, further comprising, in response to identifying at least one of the dedicated CSPs as being used above a pre-determined threshold usage level, pre-compiling instructions of the identified dedicated CSP for storage in a tightly coupled memory (TCM) CIS slot.

6. The method of claim 1, wherein the target market is a surveillance market and the dedicated (CSPs) include at least one of a motion-detect CSP and an image processing CSP.

7. The method of claim 1, wherein the target market is a digital image processing market and the dedicated (CSPs) include at least one of a fast Fourier transform CSP, a data compression CSP, and a data encryption CSP.

8. The method of claim 1, further comprising:
   dedicating a set of CIS slots in the computational storage device for the dedicated CSPs; and
   dedicating a set of eBPF registers to correspond to the dedicated CSPs.

9. The method of claim 1, further comprising constraining access by the CSP processor to a subset of DRAMs used by the dedicated CSPs.

10. In a computing environment, a method performed at least in part on at least one processor, the method comprising:
    determining one or more dedicated computations storage programs (CSPs) used in a target market for a computational storage device;
    storing the dedicated CSPs in one or more pre-programmed computing instruction set (CIS) slots in the computational storage device;
    translating one or more instructions of the dedicated CSPs to be processable by a native processor;
    loading one or more instructions of a CSP stored in a programmable CIS slot to a CSP processor implemented within an application specific integrated circuit (ASIC) of the computational storage device; and
    processing the one or more instructions of the CSP stored in a programmable CIS slot using the CSP processor.

11. The method of claim 10, wherein the native processor of the computational storage device controls loading one or more instructions of the dedicated CSPs to the CSP processor.

12. The method of claim 11, wherein the native processor of computational storage device controls loading one or more instructions of the dedicated CSPs to the CSP processor using a common bus of the computational storage device.

13. The method of claim 10, wherein the dedicated CSPs are eBPF instruction sets and the CSP progressor is an extended Berkley Packet Filter (eBPF) processor.

14. The method of claim 10, further comprising, in response to identifying at least one of the dedicated CSPs as being used above a pre-determined threshold usage level, pre-compiling instructions of the identified dedicated CSP for storage in a tightly coupled memory (TCM) CIS slot.

15. The method of claim 10, further comprising:
    dedicating a set of CIS slots in the computational storage device for the dedicated CSPs; and
    dedicating a set of extended Berkley Packet Filter (eBPF) registers to correspond to the dedicated CSPs.

16. The method of claim 10, further comprising constraining access by the CSP processor to a subset of DRAMs used by the dedicated CSPs.

17. One or more tangible computer-readable storage media devices encoding computer-executable instructions for executing on a computer system a computer process, the computer process comprising:
    determining one or more dedicated computations storage programs (CSPs) used in a target market for a computational storage device;
    storing the dedicated CSPs in one or more pre-programmed computing instruction set (CIS) slots in the computational storage device;
    translating one or more instructions of the dedicated CSPs to be processable by a native processor;
    loading one or more instructions of a CSP stored in a programmable CIS slot to a CSP processor implemented within an application specific integrated circuit (ASIC) of the computational storage device; and
    processing the one or more instructions of the CSP stored in the programmable CIS slot using the CSP processor.

18. One or more tangible computer-readable storage media devices of claim 17, wherein the native processor of the computational storage device controls loading one or more instructions of the CSP stored in the programmable CIS slot to the CSP processor.

19. One or more tangible computer-readable storage media devices of claim 18, wherein the native processor of computational storage device controls loading one or more instructions of the CSP stored in the programmable CIS slot to the CSP processor using a common bus of the computational storage device.

20. One or more tangible computer-readable storage media devices of claim 16, wherein the computer process further comprising:
   dedicating a set of CIS slots in the computational storage device for the dedicated CSPs; and
   dedicating a set of extended Berkley Packet Filter (eBPF) registers to correspond to the dedicated CSPs.

* * * * *